US011618432B2

(12) United States Patent
Morii et al.

(10) Patent No.: US 11,618,432 B2
(45) Date of Patent: Apr. 4, 2023

(54) PROGRAM UPDATE METHOD

(71) Applicant: HONDA MOTOR CO., LTD., Tokyo (JP)

(72) Inventors: Soichi Morii, Saitama (JP); Tsuyoshi Kokubo, Saitama (JP); Satoshi Ueno, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 17/123,704

(22) Filed: Dec. 16, 2020

(65) Prior Publication Data

US 2021/0188243 A1 Jun. 24, 2021

(30) Foreign Application Priority Data

Dec. 19, 2019 (JP) .............................. JP2019-229445

(51) Int. Cl.
*B60W 20/13* (2016.01)
*B60W 10/24* (2006.01)
*B60W 10/08* (2006.01)
*B60W 10/06* (2006.01)
*B60W 50/06* (2006.01)
*G06F 8/65* (2018.01)
*B60L 1/00* (2006.01)

(52) U.S. Cl.
CPC .............. *B60W 20/13* (2016.01); *B60L 1/00* (2013.01); *B60W 10/06* (2013.01); *B60W 10/08* (2013.01);
(Continued)

(58) Field of Classification Search
CPC ...... B60W 20/13; B60W 10/06; B60W 10/08; B60W 10/24; B60W 50/06;
(Continued)

(56) References Cited

U.S. PATENT DOCUMENTS

2007/0210743 A1* 9/2007 Tabei ...................... B60L 58/20
320/104
2013/0132939 A1* 5/2013 Murata ..................... G06F 8/65
717/173
(Continued)

FOREIGN PATENT DOCUMENTS

JP 2003-111212 A 4/2003
JP 2007-237905 A 9/2007
(Continued)

OTHER PUBLICATIONS

Apr. 5, 2022, Japanese Office Action issued for related JP Application No. 2019-229445.

*Primary Examiner* — George C Jin
(74) *Attorney, Agent, or Firm* — Paratus Law Group, PLLC

(57) ABSTRACT

A program update method includes a first step of acquiring a remaining capacity of electric power stored in an electric power storage device, a second step of acquiring an electric power amount required for the control device to update the control program, a third step of determining whether the remaining capacity is smaller than the electric power amount, a fourth step of charging the electric power storage device such that the remaining capacity becomes the electric power amount or larger when it is determined that the remaining capacity is smaller than the electric power amount in the third step, and a fifth step of causing the control device to update the control program when the remaining capacity becomes the electric power amount or larger in the fourth step. The first to fifth steps are performed when the vehicle is operating.

8 Claims, 11 Drawing Sheets

(52) U.S. Cl.
CPC ............ *B60W 10/24* (2013.01); *B60W 50/06* (2013.01); *G06F 8/65* (2013.01); *B60W 2510/244* (2013.01)

(58) Field of Classification Search
CPC ... B60W 2510/244; B60L 1/00; B60L 3/0046; B60L 3/12; B60L 58/12; B60L 11/1859; B60L 11/1861; B60L 11/1848; G06F 8/65; B60K 6/46
See application file for complete search history.

(56) References Cited

U.S. PATENT DOCUMENTS

| | | | | |
|---|---|---|---|---|
| 2014/0379183 | A1* | 12/2014 | Long | B60W 50/14 701/22 |
| 2015/0149015 | A1* | 5/2015 | Nakano | B60L 53/80 701/22 |
| 2015/0301822 | A1* | 10/2015 | Takahashi | B60R 16/023 717/173 |
| 2017/0197521 | A1* | 7/2017 | Park | B60L 58/15 |
| 2018/0136924 | A1 | 5/2018 | Okuyama et al. | |
| 2019/0111907 | A1* | 4/2019 | Harata | G06F 11/00 |
| 2019/0250903 | A1* | 8/2019 | Seki | B60R 16/02 |
| 2021/0403016 | A1* | 12/2021 | Jung | G06F 11/1433 |

FOREIGN PATENT DOCUMENTS

| | | |
|---|---|---|
| JP | 2010-132052 A | 6/2010 |
| JP | 2010-208353 A | 9/2010 |
| JP | 2013-091434 A | 5/2013 |
| JP | 2014-106875 A | 6/2014 |
| JP | 2017-220091 A | 12/2017 |
| JP | 2018-065432 A | 4/2018 |
| JP | 2018-081470 A | 5/2018 |
| JP | 6332580 B1 | 5/2018 |

* cited by examiner

PROGRAM UPDATE METHOD

CROSS-REFERENCE TO RELATED APPLICATIONS

This application is based on and claims priority under 35 USC 119 from Japanese Patent Application No. 2019-229445 filed on Dec. 19, 2019.

TECHNICAL FIELD

The present disclosure relates to a program update method for updating a control program of a control device configured to control an in-vehicle device.

BACKGROUND ART

Vehicles in recent years have been computerized, and control an in-vehicle device by using a control device called an electronic control unit (ECU). This control device controls the in-vehicle device to be controlled by executing a control program stored in advance in a memory or the like of the control device. A technique capable of updating a control program of the control device that controls the in-vehicle device is also known.

For example, JP-A-2017-220091 (Patent Literature 1) discloses a technique for controlling an update of a program stored in the ECU in response to an update request from a vehicle user and notifying the vehicle user of whether a vehicle can drive when the program is rewritten.

Japanese Patent No. 6332580 (Patent Literature 2) discloses a technique for updating a control program when at least two electric power supplies (for example, a main battery and a sub battery) can output electric power required for updating the control program so as to prevent the update of the control program of an in-vehicle control device from failing due to insufficient electric power of the battery.

SUMMARY OF INVENTION

In the related art, although it is possible to prevent the update of the control program from failing due to insufficient electric power of an electric power storage device, the control program of the control device may not be updated for a long period of time depending on an electric power status of the electric power storage device.

On the other hand, from a viewpoint of appropriately operating the in-vehicle device, it is desired to update the control program of the control device as early as possible, and there is room for improvement in this point.

The present disclosure provides a program update method for enabling a control program to update early while preventing an update of the control program from failing due to insufficient electric power of an electric power storage device.

According to the present disclosure, there is provided a program update method for updating a control program of a control device configured to control an in-vehicle device mounted on a vehicle, the program update method including: a first step of acquiring a remaining capacity of electric power stored in an electric power storage device which is configured to supply electric power to the control device updating the control program; a second step of acquiring an electric power amount required for the control device to update the control program; a third step of determining whether the remaining capacity acquired in the first step is smaller than the electric power amount acquired in the second step; a fourth step of charging the electric power storage device such that the remaining capacity becomes the electric power amount or larger when it is determined that the remaining capacity is smaller than the electric power amount in the third step; and a fifth step of causing the control device to update the control program when the remaining capacity becomes the electric power amount or larger in the fourth step, in which the first to fifth steps are performed when the vehicle is operating.

The present disclosure provides a program update method for enabling a control program to update early while preventing an update of the control program from failing due to insufficient electric power of an electric power storage device.

DESCRIPTION OF EMBODIMENTS

Hereinafter, each embodiment of a program update method of the present disclosure will be described in detail with reference to the drawings.

First Embodiment

[Program Update System]

Figure 1:
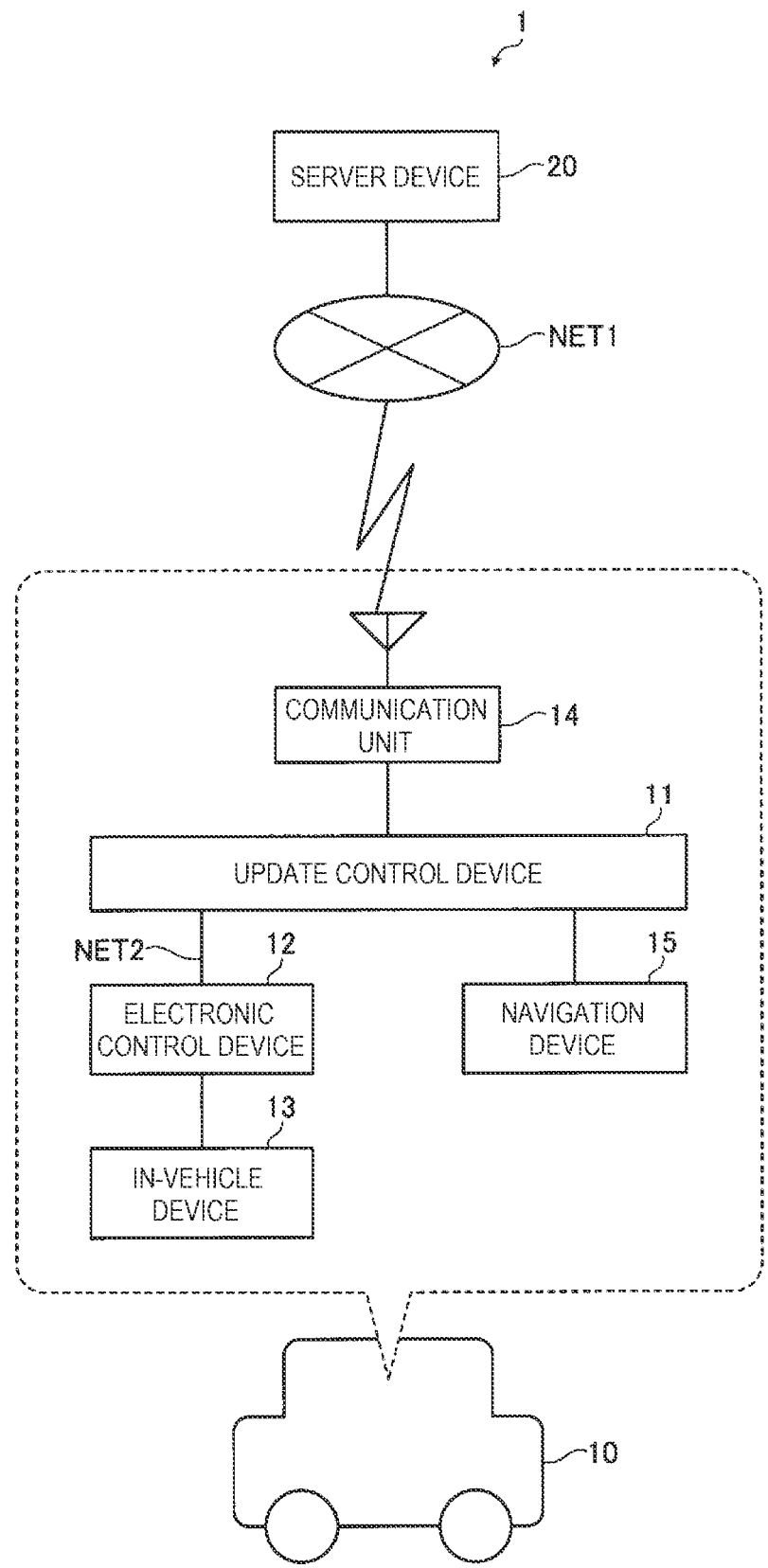
FIG. 1 illustrates an example of a configuration of a program update system according to a first embodiment.

First, a program update system according to a first embodiment will be described with reference to FIG. 1. As illustrated in FIG. 1, the program update system 1 includes a vehicle 10 and a server device 20. In the program update system 1, the vehicle 10 and the server device 20 can communicate via a network NET 1. The network NET 1 is, for example, a mobile communication network. The network NET 1 may be a wide area network (WAN), a local area network (LAN), the Internet, or the like.

Figure 2:
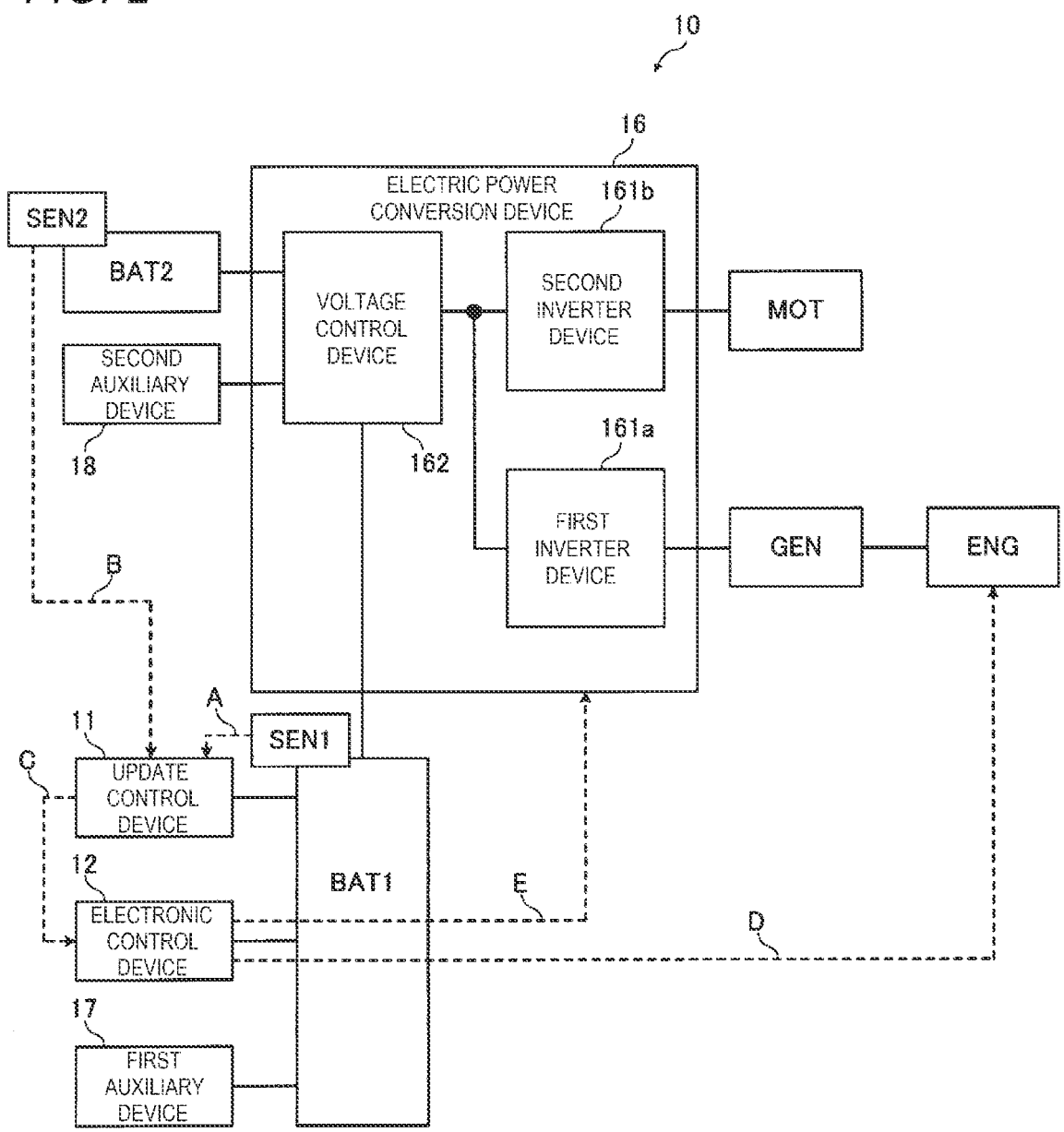
FIG. 2 illustrates an example of an electrical configuration of a vehicle according to the first embodiment.

The vehicle 10 is, for example, a so-called hybrid electrical vehicle (see FIG. 2). As illustrated in FIG. 1, the vehicle 10 includes an update control device 11, an electronic control device 12, and an in-vehicle device 13.

The update control device 11 is, for example, a gateway electronic control unit (ECU) configured to relay transmission and reception of data between the network NET 1 and an in-vehicle network NET 2 of the vehicle 10. The in-vehicle network NET 2 is, for example, a controller area network (CAN). The in-vehicle network NET 2 may be a local interconnect network (LIN), Flex Ray, Ethernet (registered trademark), or the like.

Specifically, the update control device 11 can communicate with the server device 20 via the network NET 1 by a communication unit 14 mounted on the vehicle 10. The communication unit 14 is, for example, an in-vehicle communication device provided in the vehicle 10. The communication unit 14 may be a terminal device (for example, a smart phone) held by a user of the vehicle 10. However, in this case, it is assumed that the terminal device of the user can communicate with the update control device 11 and the server device 20.

The update control device 11 can communicate with the electronic control device 12 via the in-vehicle network NET 2. The electronic control device 12 is, for example, an ECU configured to control the in-vehicle device 13. The in-vehicle device 13 is a device configured to perform predetermined operation under control of the electronic control device 12, and is, for example, an engine (see a reference numeral ENG in FIG. 2) of the vehicle 10, an electric power conversion device (see a reference numeral 16 in FIG. 2), and the like. The in-vehicle device 13 may be various auxiliary devices (see reference numerals 17 and 18 in FIG. 2) of the vehicle 10 and the like.

As will be described in detail later, the electronic control device 12 includes a processor (see a reference numeral 121 in FIG. 4) and a memory (see a reference numeral 122 in FIG. 4), and a predetermined control program is stored in advance in the memory. Then, the processor executes the control program stored in the memory of the electronic control device 12, so that the electronic control device 12 controls the in-vehicle device 13.

FIG. 1 illustrates an example in which a set of the electronic control device 12 and the in-vehicle device 13 are connected to the update control device 11. However, the present disclosure is not limited thereto. Two or more sets of the electronic control device 12 and the in-vehicle device 13 may be connected to the update control device 11. A plurality of in-vehicle devices 13 may be connected to one electronic control device 12, and one electronic control device 12 may control the plurality of in-vehicle devices 13.

The vehicle 10 further includes a navigation device 15 that can communicate with the update control device 11. The navigation device 15 is a so-called car navigation system. That is, the navigation device 15 has a function of specifying a current position of the vehicle 10 by, for example, a global positioning system (GPS) or executing route guidance to a destination based on map data stored in advance and the current position of the vehicle 10. The navigation device 15 includes a display unit (see a reference numeral 155 in FIG. 5) capable of displaying various types of information, an operation unit (see a reference numeral 156 in FIG. 5) configured to receive operation of a user, and the like.

The server device 20 is, for example, a server (a computer) managed by a manufacturer (for example, an employee of a car maker, and hereinafter, simply referred to as a manufacturer) of the vehicle 10. The server device 20 is configured to transmit a control program of the electronic control device 12 to the vehicle 10 via the network NET 1.

Specifically, for example, when any problem is found in the control program of the electronic control device 12, the manufacturer improves (upgrades) the control program so as to solve this problem, and registers the improved control program in the server device 20 as an update control program.

For example, when the serer device 20 receives a download request of the update control program from the vehicle 10 (the update control device 11), the server device 20 transmits the update control program registered in the server device 20 to the update control device 11 of a download request source via the network NET 1. Accordingly, the update control device 11 can acquire the update control program from the server device 20. FIG. 1 illustrates an example in which one update control device 11 is connected to the server device 20. However, the present disclosure is not limited thereto. For example, two or more update control devices 11 mounted on the different vehicles 10 may be connected to the server device 20.

[Vehicle]

Next, an electrical configuration of the vehicle 10 will be described with reference to FIG. 2. As described above, the vehicle 10 is, for example, a hybrid electric vehicle, and includes an engine ENG, a generator GEN, a motor MOT, a first battery BAT 1, a second battery BAT 2, an electric power conversion device 16, a first auxiliary device 17, and a second auxiliary device 18 as illustrated in FIG. 2.

The engine ENG outputs power to drive the generator GEN by being supplied with fuel. The generator GEN is driven by the power of the engine ENG to generate electric power. Specifically, the generator GEN is an AC motor (for example, a three-phase AC motor), and is configured to output an alternating current when electric power generation is performed. The alternating current output from the generator GEN is input to the electric power conversion device 16 configured to convert electric power. The electric power conversion device 16 will be described later.

The motor MOT is configured to output power to drive the vehicle 10 by being supplied with electric power from the electric power conversion device 16. The power of the motor MOT is transmitted to a drive wheel (not illustrated) of the vehicle 10 by a power transmission path (not illustrated) provided in the vehicle 10. Accordingly, the vehicle 10 can drive by the power of the motor MOT Specifically, the motor MOT is an AC motor (for example, a three-phase AC motor), and is configured to output power to drive the drive wheel of the vehicle 10 when an alternating current is input. The motor MOT generates electric power (so-called regenerative power generation) when a vehicle is braked, and outputs an alternating current. The alternating current output from the motor MOT is input to the electric power conversion device 16.

The electric power conversion device 16 is, for example, a so-called power control unit (PCU), and is configured to convert electric power input from the generator GEN and to output the converted electric power to the first battery BAT 1 and the second battery BAT 2. Accordingly, the first battery BAT 1 and the second battery BAT 2 can be charged by the electric power generated by the generator GEN. The first battery BAT 1 and the second battery BAT 2 will be described later.

The electric power conversion device 16 is configured to convert electric power input from the second battery BAT 2 and to output the converted electric power to the motor MOT. Accordingly, the motor MOT can output power to drive the vehicle 10 by being supplied with the electric power of the second battery BAT 2.

Specifically, the electric power conversion device 16 includes a first inverter device 161*a*, a second inverter device 161*b*, and a voltage control device 162. The first inverter device 161*a* is configured to convert an alternating current input from the generator GEN into a direct current and to output the direct current to the voltage control device 162. The second inverter device 161*b* is configured to convert a direct current input from the voltage control device 162 into an alternating current and to output the alternating current to the motor MOT. The second inverter device 161*b* is configured to convert an alternating current into a direct current and to output the direct current to the voltage control device 162 when, for example, the alternating current is input from the motor MOT configured to perform regenerative power generation.

The voltage control device 162 is configured to convert an input voltage into a desired voltage. For example, the voltage control device 162 steps down a DC voltage input from the first inverter device 161*a* and outputs the voltage to the first battery BAT 1 and the second battery BAT 2. The voltage control device 162 boosts an AC voltage input from the second battery BAT 2 and outputs the boosted voltage to the second inverter device 161*b*. The voltage control device 162 is, for example, a DC/DC converter.

The first battery BAT 1 can output a low voltage such as 12 [V], and supplies electric power for operating the update control device 11 and the electronic control device 12 to the update control device 11 and the electronic control device 12. The first battery BAT 1 is, for example, a lead battery. The first battery BAT 1 is provided with a first battery sensor SEN 1 configured to detect a state of the first battery BAT 1. Here, the state of the first battery BAT 1 is, for example, an output and a temperature of the first battery BAT 1.

Specifically, the first battery sensor SEN 1 includes a first battery output sensor configured to detect the output of the first battery BAT 1. The first battery output sensor is configured to detect an inter-terminal voltage and a charge and discharge current of the first battery BAT 1 as the output of the first battery BAT 1. The first battery sensor SEN 1 may further include a first battery temperature sensor configured to detect the temperature of the first battery BAT 1. Then, the first battery sensor SEN 1 sends first battery information indicating a detected state of the first battery BAT 1 to the update control device 11 (see a dotted arrow of a reference numeral A in FIG. 2). Accordingly, the first battery sensor SEN 1 can notify the detected state of the first battery BAT 1 to the update control device 11.

The first battery BAT 1 also supplies electric power to the first auxiliary device 17, for example. The first auxiliary device 17 is an electronic device that is mounted on the vehicle 10 and is configured to perform predetermined operation by being supplied with electric power. The first auxiliary device 17 is, for example, a meter, a headlamp, a power steering drive device, or the like.

The second battery BAT 2 can output a high voltage such as 100 [V] to 200 [V], and is configured to output electric power for driving the motor MOT to the electric power conversion device 16. The second battery BAT 2 is a so-called drive battery, and is, for example, a lithium ion battery, a nickel hydrogen battery, or the like. The second battery BAT 2 is provided with a second battery sensor SEN 2 configured to detect a state of the second battery BAT 2. Here, the state of the second battery BAT 2 is, for example, an output and a temperature of the second battery BAT 2.

Specifically, the second battery sensor SEN 2 includes a second battery output sensor configured to detect the output of the second battery BAT 2. The second battery output sensor is configured to detect an inter-terminal voltage and a charge and discharge current of the second battery BAT 2 as the output of the second battery BAT 2. The second battery sensor SEN 2 may further include a second battery temperature sensor configured to detect the temperature of the second battery BAT 2. Then, the second battery sensor SEN 2 sends second battery information indicating a detected state of the second battery BAT 2 to the update control device 11 (see a dotted arrow of a reference numeral B in FIG. 2). Accordingly, the second battery sensor SEN 2 can notify the detected state of the second battery BAT 2 to the update control device 11.

The second battery BAT 2 also supplies power to the second auxiliary device 18 via the electric power conversion device 16, for example. The second auxiliary device 18 is an electronic device that is mounted on the vehicle 10 and is configured to perform predetermined operation by being supplied with electric power. The second auxiliary device 18 is, for example, an air conditioner, an audio device, or the like. As will be described in detail later, in the vehicle 10, electric power supplied to the second auxiliary device 18 may decrease as the first battery BAT 1 is charged. Therefore, the second auxiliary device 18 is preferably an electronic device that does not play an important role in driving the vehicle 10 (that is, an electronic device that does not require a stable supply of electric power).

As described above, the update control device 11 can communicate with the electronic control device 12 via the in-vehicle network NET 2. Therefore, as will be described later, for example, when the update control program is acquired from the server device 20, the update control device 11 transmits the update control program to the electronic control device 12, thereby instructing the electronic control device 12 to update the control program based on the update control program (see a dotted arrow of a reference numeral C in FIG. 2).

The update control device 11 can also instruct the electronic control device 12 to execute predetermined control on the in-vehicle device 13. For example, the update control device 11 instructs the electronic control device 12 configured to control the engine ENG to increase a rotation speed of the engine ENG (hereinafter, simply referred to as an engine speed). In response to this instruction, the electronic control device 12 configured to control the engine ENG increases the engine speed (see a dotted arrow of a reference numeral D in FIG. 2).

For example, the update control device 11 instructs the electronic control device 12 configured to control the electric power conversion device 16 to supply electric power to the first battery BAT 1. In response to this instruction, the electronic control device 12 configured to control the electric power conversion device 16 supplies electric power to the first battery BAT 1 (see a dotted arrow of a reference numeral E in FIG. 2). For example, at this time, if the generator GEN generates electric power, the electric power generated by the generator GEN is supplied to the first battery BAT 1. On the other hand, if the generator GEN does not generate power, electric power of the second battery BAT 2 is supplied to the first battery BAT 1. That is, the first battery BAT 1 can be charged with the electric power generated by the generator GEN and can be charged with the electric power of the second battery BAT 2.

FIG. 2 illustrates a state in which one electronic control device 12 controls the engine ENG and the electric power conversion device 16. However, the present disclosure is not limited thereto. The electronic control devices 12 configured to control the engine ENG and the electric power conversion device 16 may be the different electronic control devices 12.

[Update Control Device]

Figure 3:
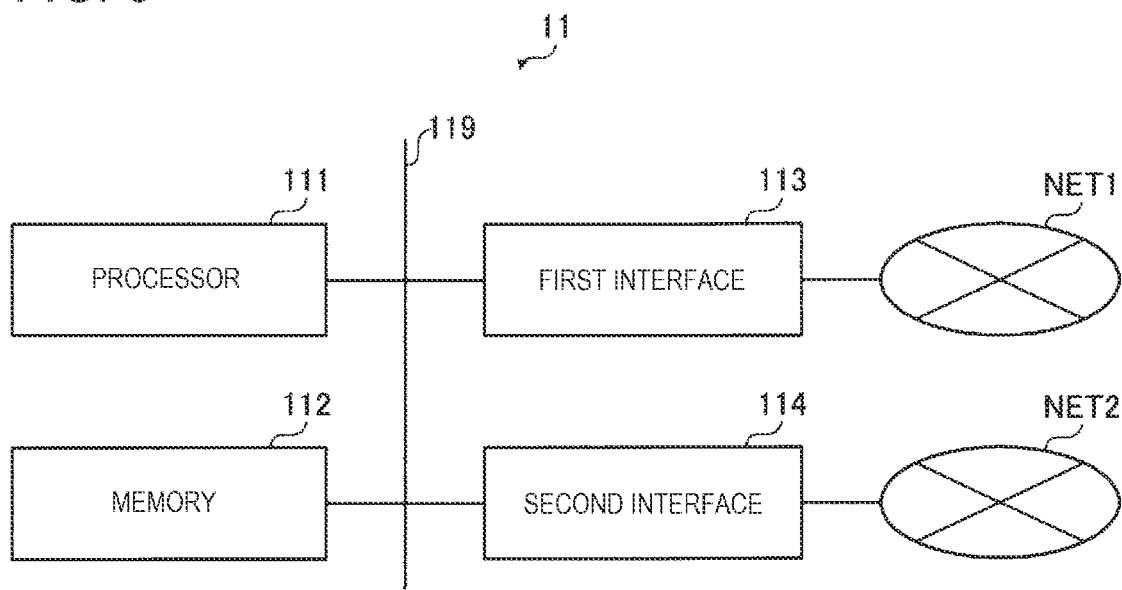
FIG. 3 illustrates an example of a configuration of an update control device according to the first embodiment.

Next, an example of a configuration of the update control device 11 will be described with reference to FIG. 3. As illustrated in FIG. 3, the update control device 11 includes a processor 111, a memory 112, a first interface 113, and a second interface 114. The components 111 to 114 are connected by a bus 119.

The processor 111 is, for example, a central processing unit (CPU) configured to control the entire update control device 11. The memory 112 includes, for example, a main memory such as a random access memory (RAM) and an auxiliary memory which is a nonvolatile memory such as a flash memory. The main memory is used as a work area of the processor 111. The auxiliary memory is configured to store various programs for operating the update control device 11. The program for operating the update control device 11 is, for example, a program for implementing processing illustrated in FIG. 8 (described later). The program stored in the auxiliary memory is loaded into the main memory and is executed by the processor 111.

The first interface 113 is connected to the network NET 1, and is configured to control input and output of data between the update control device 11 and an outside (for example, the server device 20) via the network NET 1. The first interface 113 is controlled by the processor 111.

The second interface 114 is connected to the in-vehicle network NET 2, and is configured to control input and output of data between the update control device 11 and an outside (for example, the electronic control device 12) via the in-vehicle network NET 2. The second interface 114 is controlled by the processor 111.

[Electronic Control Device]

Figure 4:
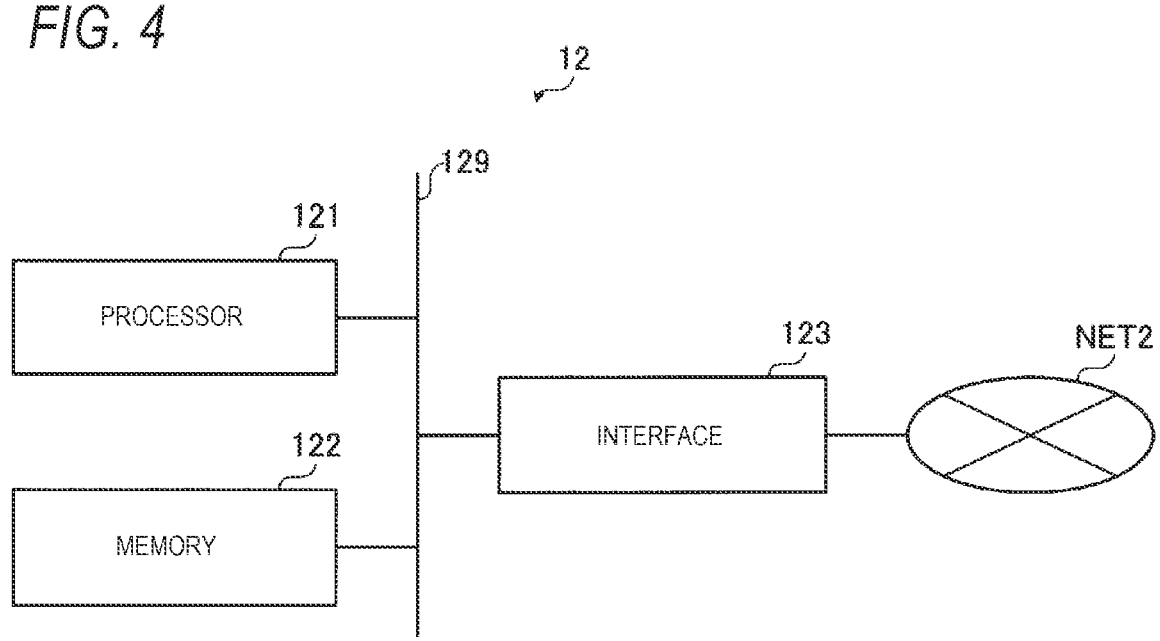
FIG. 4 illustrates an example of a configuration of an electronic control device according to the first embodiment.

Next, an example of a configuration of the electronic control device 12 will be described with reference to FIG. 4. As illustrated in FIG. 4, the electronic control device 12 includes a processor 121, a memory 122, and an interface 123. The components 121 to 123 are connected by a bus 129.

The processor 121 is, for example, a CPU configured to control the entire electronic control device 12. The memory 122 includes, for example, a main memory such as a RAM and an auxiliary memory which is a nonvolatile memory such as a flash memory. The main memory is used as a work area of the processor 121. The auxiliary memory is configured to store various programs for operating the electronic control device 12. The program for operating the electronic control device 12 is, for example, a control program for controlling the in-vehicle device 13. The program stored in the auxiliary memory is loaded into the main memory and is executed by the processor 121.

The interface 123 is connected to the in-vehicle network NET 2, and is configured to control input and output of data between the electronic control device 12 and an outside (for example, the update control device 11) via the in-vehicle network NET 2. The interface 123 is controlled by the processor 121.

[Navigation Device]

Figure 5:
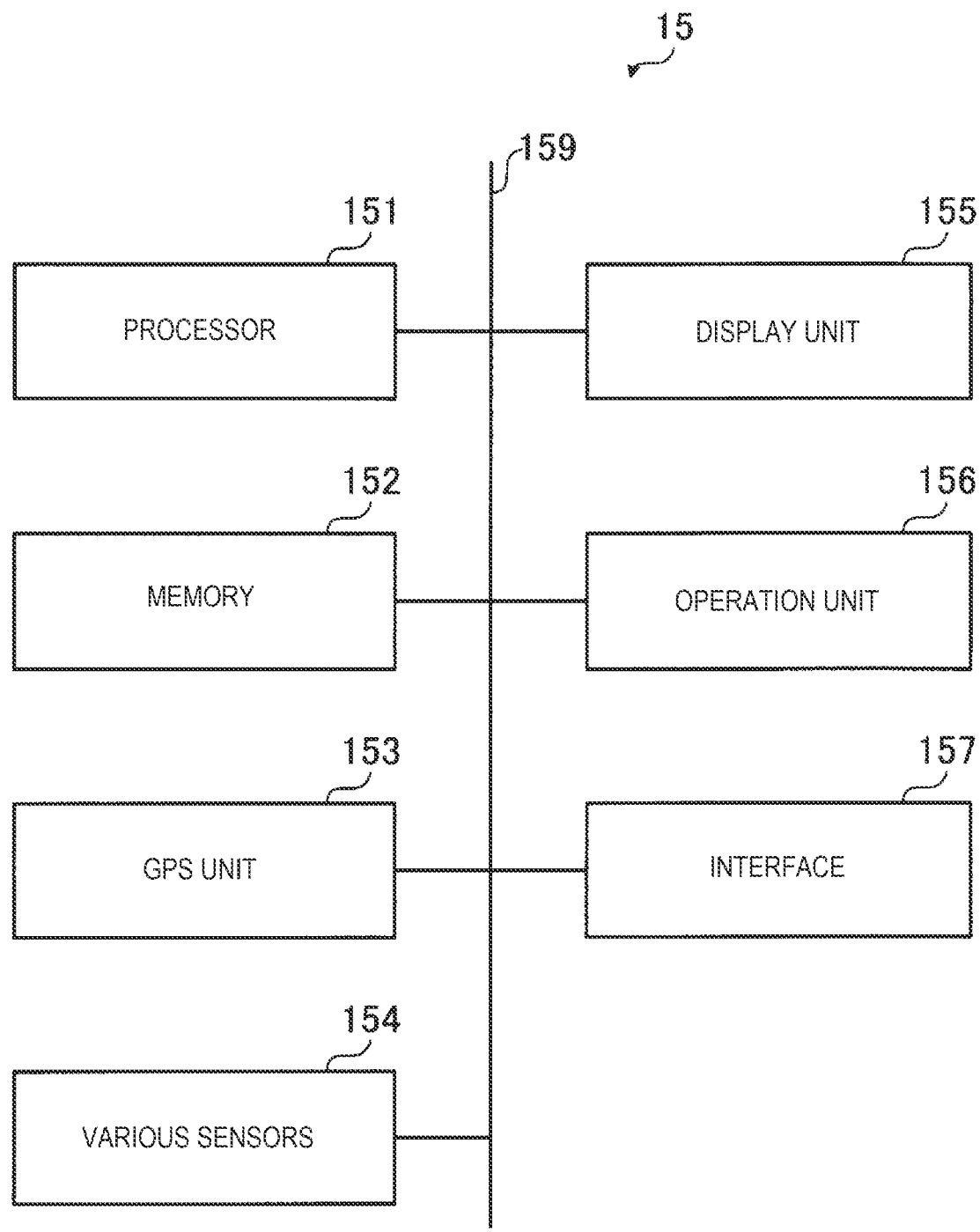
FIG. 5 illustrates an example of a configuration of a navigation device according to the first embodiment.

Next, an example of a configuration of the navigation device 15 will be described with reference to FIG. 5. As illustrated in FIG. 5, the navigation device 15 includes a processor 151, a memory 152, a GPS unit 153, various sensors 154, a display unit 155, an operation unit 156, and an interface 157. The components 151 to 157 are connected to one another by a bus 159.

The processor 151 is, for example, a CPU configured to control the entire navigation device 15. The memory 152 includes, for example, a main memory such as a RAM and an auxiliary memory which is a nonvolatile memory such as a flash memory. The main memory is used as a work area of the processor 151. The auxiliary memory is configured to store various programs for operating the navigation device 15. The program stored in the auxiliary memory is loaded into the main memory and is executed by the processor 151.

The auxiliary memory of the navigation device 15 is also configured to store map data used for specifying a current position of the vehicle 10, route guidance to a destination, and the like. The detailed description is omitted. However, the map data includes road data representing a road on which a moving body (for example, the vehicle 10) is movable, facility data representing information on each facility, and the like.

The GPS unit 153 is configured to receive a GPS signal (a radio wave) from a GPS satellite and to measure a current position of the vehicle 10. A current position measured by the GPS unit 153 is used to specify a current position of the vehicle 10. The various sensors 154 are configured to output information for measuring a behavior of the vehicle 10 (or the navigation device 15). The various sensors 154 are, for example, an acceleration sensor, an angular velocity sensor, and the like. Output values of the various sensors 154 are also used, for example, when a current position of the vehicle 10 is specified.

The display unit 155 includes a display configured to display a character and an image, a graphic controller configured to control the entire display, a buffer memory such as a Video RAM (VRAM) configured to temporarily record image data of an image to be displayed on the display, and the like. The display is, for example, a liquid crystal display or an organic EL display.

The operation unit 156 is configured to input an operation signal corresponding to operation received from a user to an inside (for example, the processor 151) of the navigation device 15. The operation unit 156 is, for example, a touch panel. The operation unit 156 may be a remote controller, a keyboard, a mouse, or the like that includes a plurality of keys.

The interface 157 is configured to control input and output of data between the navigation device 15 and an outside (for example, the update control device 11). The interface 157 is controlled by the processor 151.

[Server Device]

Figure 6:
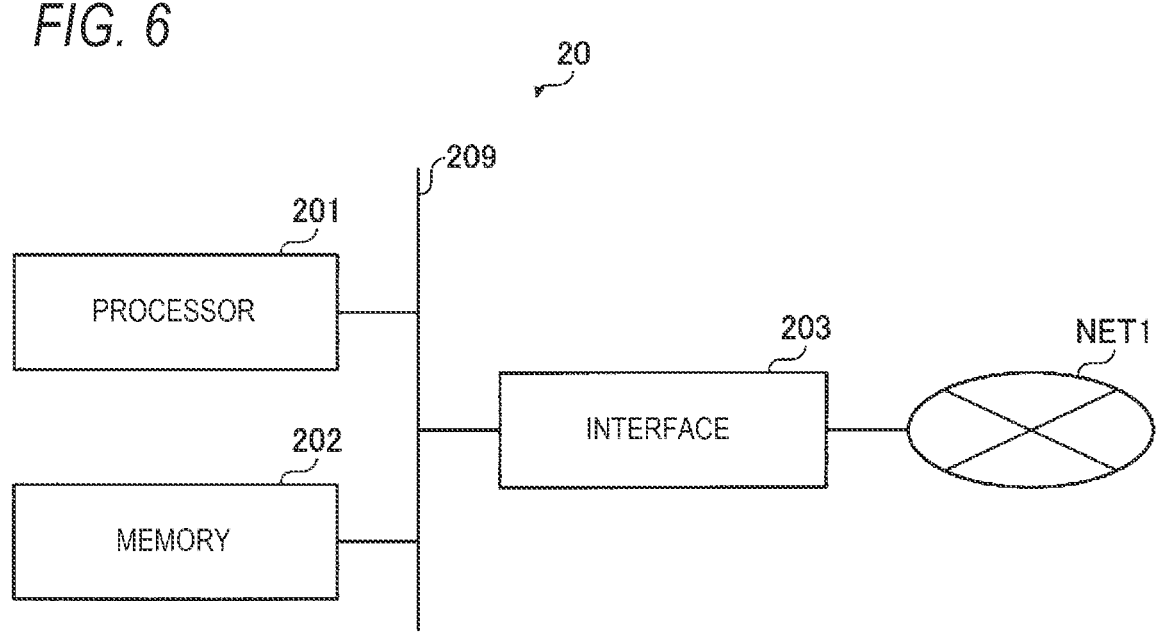
FIG. 6 illustrates an example of a configuration of a server device according to the first embodiment.

Next, an example of a configuration of the server device 20 will be described with reference to FIG. 6. As illustrated in FIG. 6, the server device 20 includes a processor 201, a memory 202, and an interface 203. The components 201 to 203 are connected by a bus 209.

The processor 201 is, for example, a CPU configured to control the entire server device 20. The memory 202 includes, for example, a main memory such as a RAM and an auxiliary memory which is a nonvolatile memory such as a flash memory. The main memory is used as a work area of the processor 201. The auxiliary memory is configured to store various programs for operating the server device 20. The program stored in the auxiliary memory is loaded into the main memory and is executed by the processor 201. The auxiliary memory of the server device 20 is also configured to store an update control program registered in the server device 20 by a manufacturer.

The interface 203 is connected to the network NET 1, and is configured to control input and output of data between the server device 20 and an outside (for example, the update control device 11) via the network NET 1. The interface 203 is controlled by the processor 201.

[Processing Executed by Each Device of Program Update System]

Figure 7:
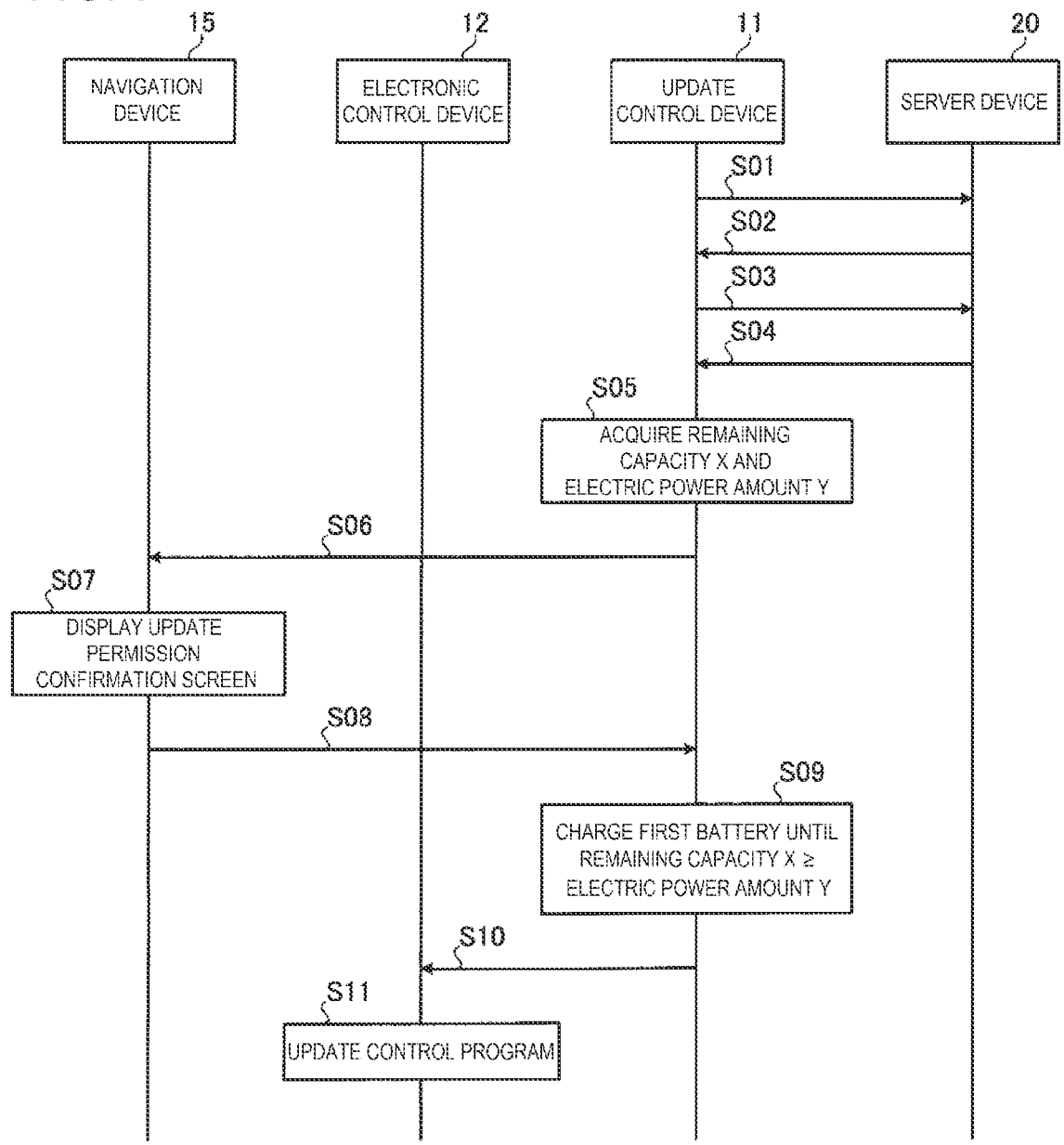
FIG. 7 is a sequence diagram illustrating an example of processing executed by each device of the program update system according to the first embodiment.

Next, an example of processing executed by each device of the program update system 1 will be described with reference to FIG. 7. As illustrated in FIG. 7, first, the update control device 11 inquires the server device 20 whether an update control program of the electronic control device 12 is present (step S01). In response to this inquiry, the server device 20 refers to the memory 202 to check whether the update control program is registered, and returns a check result (that is, presence or absence of the update control program) to the update control device 11 (step S02). Here, it is assumed that a fact that the update control program is present is returned to the update control device 11.

When the update control program is present, the update control device 11 transmits a download request for the update control program to the server device 20 (step S03). In response to the download request, the server device 20 transmits data of the update control program to the update control device 1 (step S04).

When the download of the update control program is completed, the update control device 11 acquires a remaining capacity X of electric power stored in the first battery BAT 1 and an electric power amount Y required for updating a control program (step S05). The remaining capacity X and the electric power amount Y will be described later again. Then, the update control device 11 compares the acquired remaining capacity X with the electric power amount Y. Here, it is assumed that the remaining capacity X is smaller than the electric power amount Y as a result of comparing the remaining capacity X with the electric power amount Y.

When the remaining capacity X is smaller than the electric power amount Y, if the control program is updated with the electric power stored in the first battery BAT 1 at the current time, the update of the control program may fail due to insufficient electric power of the first battery BAT 1. Therefore, in this case, in order to update the control program, it is necessary to charge the first battery BAT 1.

Therefore, the update control device 11 transmits, to the navigation device 15, a display instruction of an update permission confirmation screen for confirming to the user whether to permit the update of the update control program (Step S06). In response to this display instruction, the navigation device 15 displays the update permission confirmation screen by the display unit 155 (step S07). An example of the update permission confirmation screen will be described later with reference to FIG. 9 and the like. As will be described later, the update control device 11 may display the update permission confirmation screen on condition that the vehicle 10 approaches a predetermined parking point.

When the update permission confirmation screen is displayed, the navigation device 15 receives, from the user, a permission operation to permit the update of the update control program or a non-permission operation not to permit the update. An example of the permission operation and the non-permission operation will be described later with reference to FIG. 9 and the like. When receiving operation of the user, the navigation device 15 notifies the update control device 11 of this operation (step S08). Here, it is assumed that the update control device 11 is notified that the permission operation has been received.

When receiving the notification that the permission operation has been received, the update control device 11 charges the first battery BAT 1 until the remaining capacity X becomes the electric power amount Y or larger so as to update the control program (step S09). For example, the update control device 11 charges the first battery BAT 1 until the remaining capacity X becomes a predetermined amount that is larger than the electric power amount Y by an amount corresponding to a predetermined margin.

When the first battery BAT 1 is charged until the remaining capacity X becomes the electric power amount Y or larger, the update control device 11 instructs the electronic control device 12 to update the control program based on the downloaded update control program (step S10). In response to this update instruction, the electronic control device 12 updates the control program stored in the memory 122 (step S11).

Here, an example has been described in which the update control program is downloaded in advance before the user confirms whether to permit the update of the update control program. However, the present disclosure is not limited thereto. For example, the update control program may be downloaded when the update permission confirmation screen is displayed and the permission operation is received.

In this case, for example, when the update control program is present, the server device 20 may return to the update control device 11 that the update control program is present and a data amount (a data size) thereof in response to the inquiry as to whether the update control program is present. In this way, the update control device 11 can grasp the data amount of the update control program without downloading the update control program, and can obtain the electric power amount Y required for updating the control program based on the data amount thereof, as will be described later.

[Processing Executed by Update Control Device]

Next, an example of specific processing executed by the update control device 11 will be described with reference to FIG. 8. The update control device 11 executes the processing illustrated in FIG. 8 at a predetermined cycle, for example, while the vehicle 10 is operating.

Figure 8:
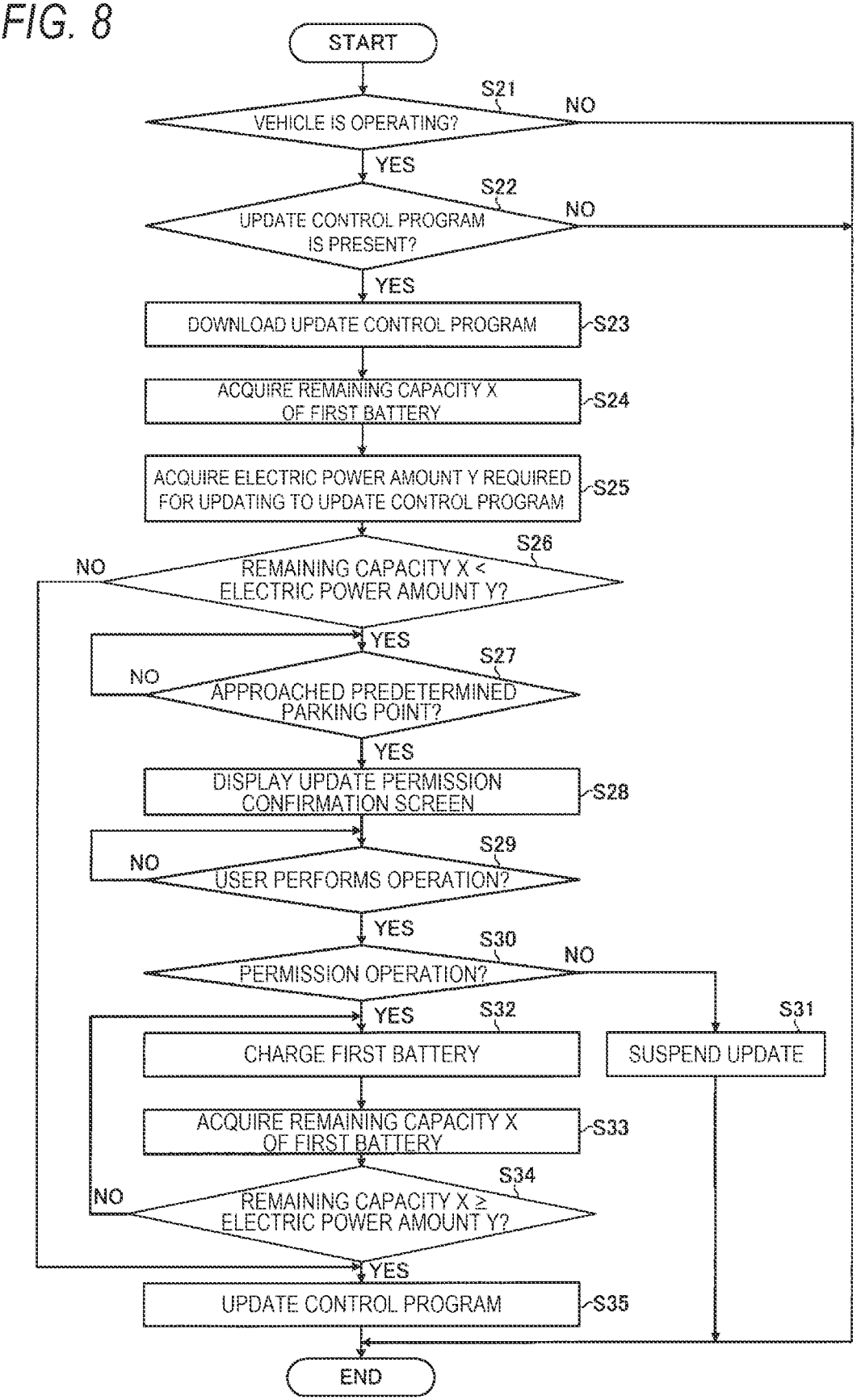
FIG. 8 is a flowchart illustrating an example of processing executed by the update control device according to the first embodiment.

As illustrated in FIG. 8, the update control device 11 determines whether the vehicle 10 is operating (step S21). For example, if an ignition power supply of the vehicle 10 is on, the update control device 11 determines that the vehicle 10 is operating. The update control device 11 may determine that the vehicle 10 is operating on condition that an accessory power supply of the vehicle 10 is on, or may determine that the vehicle 10 is operating on condition that a key of the vehicle 10 is at a key position such that the vehicle 10 can drive. If the vehicle 10 is not operating (NO in step S21), the update control device 11 ends the processing illustrated in FIG. 8.

If the vehicle 10 is operating (YES in step S21), the update control device 11 inquires the server device 20 whether the update control program is present, and determines whether the update control program is present (step S22). If the update control program is not present (NO in step S22), the update control device 11 ends the processing illustrated in FIG. 8.

When the update control program is present (YES in step S22), the update control device 11 downloads the update control program from the server device 20 (step S23). Then, when the download of the update control program is completed, the update control device 11 acquires the remaining capacity X of electric power stored in the first battery BAT 1 (step S24). The remaining capacity X can be acquired based on, for example, first battery information obtained from the first battery sensor SEN 1 and a remaining capacity map stored in advance in the update control device 11. Here, the remaining capacity map is, for example, a map defining relation between a state of the first battery BAT 1 and the remaining capacity X.

Next, the update control device 11 acquires the electric power amount Y required for updating the control program based on the downloaded update control program (step S25). The electric power amount Y can be acquired based on, for example, the data amount of the update control program and electric power consumption of the electronic control device 12 per unit time.

More specifically, for example, time required for updating the control program based on the update control program can be predicted based on the data amount of the update control program. Therefore, the electric power amount Y can be obtained based on the required time and the electric power consumption of the electronic control device 12 per unit time. As described above, by varying the electric power amount Y according to the data amount of the update control program, it is possible to obtain the electric power amount Y having high accuracy according to the data amount of the update control program. Accordingly, it is possible to appropriately charge the first battery BAT 1 so as to update the control program.

Next, the update control device 11 determines whether the remaining capacity X acquired in step S24 is smaller than the electric power amount Y acquired in step S25 (step S26). If the remaining capacity X is the electric power amount Y or larger (NO in step S26), the electric power required for updating the control program has already been stored in the first battery BAT 1, so that the update control device 11 proceeds to processing in step S35 (described later).

On the other hand, if the remaining capacity X is smaller than the electric power amount Y (YES in step S26), the update control device 11 is on standby until the vehicle 10 approaches a predetermined parking point (NO in step S27). Here, the parking point is a point at which the vehicle 10 can be assumed to be parked, and is, for example, a point set in advance as a home of the user of the vehicle 10. The parking point may be, for example, a point set in advance by the user as a stopover point (a stop-by point) or a destination, or a specific type of facility such as a service area of a toll road.

That is, when the vehicle 10 approaches the parking point, it is assumed that the user will soon stop driving the vehicle 10. Therefore, it is considered that permission of the user is likely to be obtained for lowering a driving performance (for example, a drive force) of the vehicle 10 and a performance of the second auxiliary device 18 as the first battery BAT 1 is charged. Therefore, the update permission confirmation screen is displayed as will be described later on condition that the vehicle 10 approaches this parking point, so that it is possible to make a rational charge request for the first battery BAT 1 by which the permission of the user is likely to be obtained. Whether the vehicle 10 approaches the parking point can be determined, for example, by the update control device 11 inquiring the navigation device 15.

When the vehicle 10 approaches the parking point (YES in step S27), the update control device 11 displays the update permission confirmation screen on the navigation device 15 (step S28). Then, the update control device 11 is on standby until the user performs operation (the permission operation or the non-permission operation) (NO in step S29).

When the user performs operation (YES in step S29), the update control device 11 determines whether the operation is the permission operation (step S30). If the operation is not the permission operation, that is, if the operation is the non-permission operation (NO in step S30), the update control device 11 suspends the update of the control program (step S31), and ends the processing illustrated in FIG. 8.

That is, when the operation received from the user is the non-permission operation, the processing in step S32 (described later) is not executed. Therefore, as will be described later, the engine speed does not increase and electric power supplied to the motor MOT and the like does not decrease due to the charging of the first battery BAT 1. Therefore, it is possible to prevent the fuel consumption, the driving performance, and the like of the vehicle 10 from being deteriorated due to the charging of the first battery BAT 1 against a will of the user. When the update of the control program is suspended by the processing in step S31, the update control device 11 may perform the processing from step S24 when the vehicle 10 is started next time, for example.

On the other hand, if the operation received from the user is the permission operation (YES in step S30), the update control device 11 starts to charge the first battery BAT 1 (step S32). At this time, for example, when the engine ENG is operating, the update control device 11 charges the first battery BAT 1 by the electric power generated by the generator GEN. On the other hand, if the engine ENG is not operating, the update control device 11 charges the first battery BAT 1 by the electric power of the second battery BAT 2. As described above, in the vehicle 10, since the first battery BAT 1 can be charged by the electric power generated by the generator GEN and the electric power of the second battery BAT 2, the first battery BAT 1 can be charged without a need for an external electric power supply or the like, and regardless of the driving state of the vehicle 10 (for example, even when regenerative power generation is not performed).

From a viewpoint of quickly charging the first battery BAT 1 with the electric power required for updating the control program, the update control device 11 may increase the engine speed or decrease the electric power supplied to the motor MOT and the second auxiliary device 18 as compared with a case before the processing in step S32.

Specifically, when the first battery BAT 1 is charged with the electric power generated by the generator GEN, an electric power generation amount of the generator GEN can be increased by increasing the engine speed, so that more electric power can be supplied to the first battery BAT 1.

Therefore, when the first battery BAT 1 is charged by the processing in step S32, for example, when the engine ENG is operating, the update control device 11 preferably increases the engine speed as compared with that before the processing in step S32. Accordingly, the electric power required for updating the control program can be quickly charged to the first battery BAT 1.

On the other hand, when the first battery BAT 1 is charged with the electric power of the second battery BAT 2, if the electric power supplied to the motor MOT and the second auxiliary device 18 is reduced from the electric power of the second battery BAT 2, more electric power can be supplied to the first battery BAT 1 by that amount.

Therefore, when the first battery BAT 1 is charged by the processing in step S32, the update control device 11 preferably reduces the electric power supplied to the motor MOT and the second auxiliary device 18 as compared with that before the processing in step S32, for example, if the first battery BAT 1 is charged with the electric power of the second battery BAT 2. Accordingly, it is possible to increase the electric power supplied to the first battery BAT 1 and to quickly charge the electric power required for updating the control program to the first battery BAT 1 without increasing a maximum output that can be output from the second battery BAT 2.

Next, the update control device 11 acquires the remaining capacity X of the first battery BAT 1 again (step S33), and determines whether the remaining capacity X acquired in step S33 is the electric power amount Y acquired in step S25 or larger (step S34). In step S34, for example, the update control device 11 determines whether the remaining capacity X becomes the predetermined amount that is larger than the electric power amount Y by the amount corresponding to the predetermined margin, as described above. Then, the update control device 11 continues charging the first battery BAT 1 until the remaining capacity X becomes the electric power amount Y or larger (NO in step S34).

If the remaining capacity X becomes the electric power amount Y or larger (YES in step S34), the update control device 11 instructs the electronic control device 12 to update the control program based on the update control program downloaded in step S23 (step S35), and ends the processing illustrated in FIG. 8.

Although the example has been described above in which the electric power amount Y is obtained based on the data amount or the like of the update control program. However, the present disclosure is not limited thereto. For example, data of the update control program may include information indicating the time and the electric power amount Y that are required for updating the control program based on the update control program. In this way, it is possible to easily acquire the electric power amount Y based on the downloaded update control program.

[Update Permission Confirmation Screen According to First Embodiment]

Figure 9:
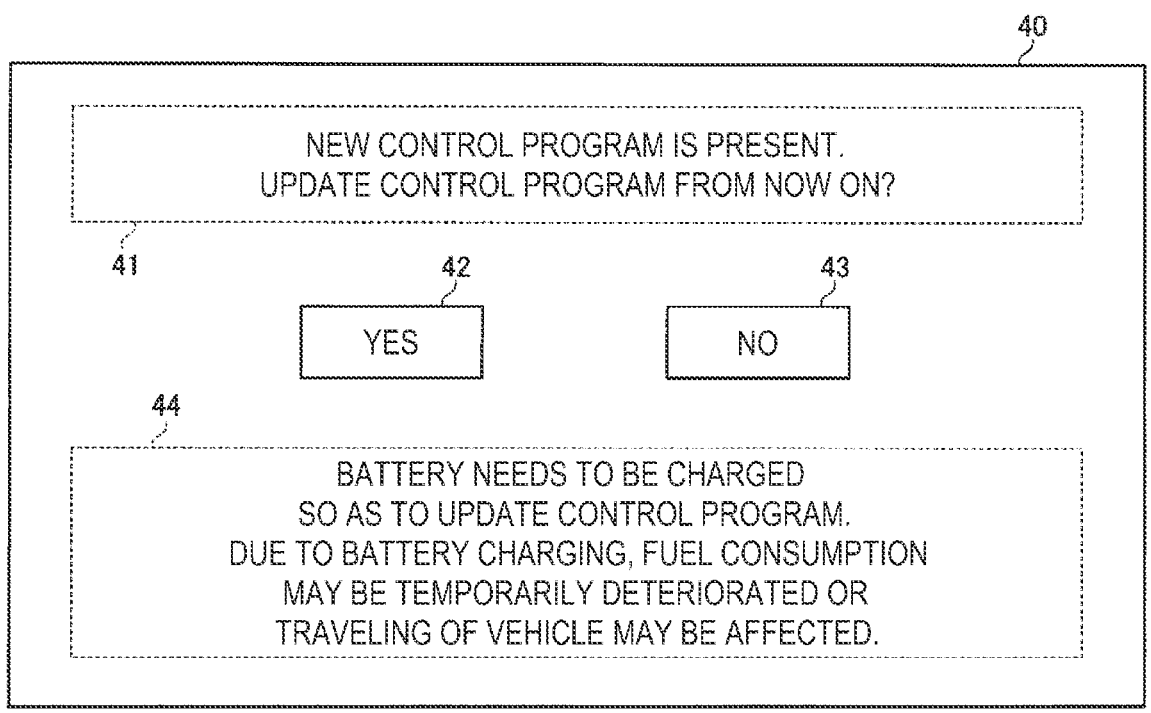
FIG. 9 illustrates an example of an update permission confirmation screen according to the first embodiment.

Next, an example of the update permission confirmation screen according to the first embodiment will be described with reference to FIG. 9. As illustrated in FIG. 9, an update permission confirmation screen 40 displays a message 41 that confirms to the user as to whether to permit the update of the update control program, a permission operation button 42, and a non-permission operation button 43. For example, the user can perform the permission operation by touching the permission operation button 42, and can perform the non-permission operation by touching the non-permission operation button 43.

When the engine speed is increased during the charging of the first battery BAT 1, the fuel consumption of the vehicle 10 may be temporarily deteriorated. When the electric power supplied from the second battery BAT 2 to the motor MOT is reduced during the charging of the first battery BAT 1, the driving performance of the vehicle 10 may be temporarily deteriorated.

Therefore, on the update permission confirmation screen 40, it is preferable to display a message 44 that notifies the user that the fuel consumption and the driving performance of the vehicle 10 may be temporarily deteriorated when the first battery BAT 1 is charged. In this way, when the first battery BAT 1 is charged, the user can perform the permission operation or the non-permission operation after knowing that the fuel consumption and the driving performance of the vehicle 10 may be temporarily deteriorated.

As described above, when the update control program is present, the update control device 11 according to the first embodiment charges the first battery BAT 1 until the remaining capacity X of the first battery BAT 1 becomes the electric power amount Y required for updating the control program or larger if the remaining capacity X is smaller than the electric power amount Y. Then, the update control device 11 can cause the electronic control device 12 to update the control program based on the update control program after the first battery BAT 1 is charged until the remaining capacity X becomes the electric power amount Y or larger. Accordingly, the update control device 11 can early update the control program while preventing an update failure of the control program due to insufficient electric power of the first battery BAT 1.

Second Embodiment

Next, a second embodiment of the present disclosure will be described. In the following second embodiment, the same components as those according to the first embodiment are denoted by the same reference numerals, and the description thereof is omitted as appropriate. The following second embodiment is different from the first embodiment in that the vehicle 10 is a so-called plug-in hybrid electric vehicle.

[Vehicle]

Figure 10:
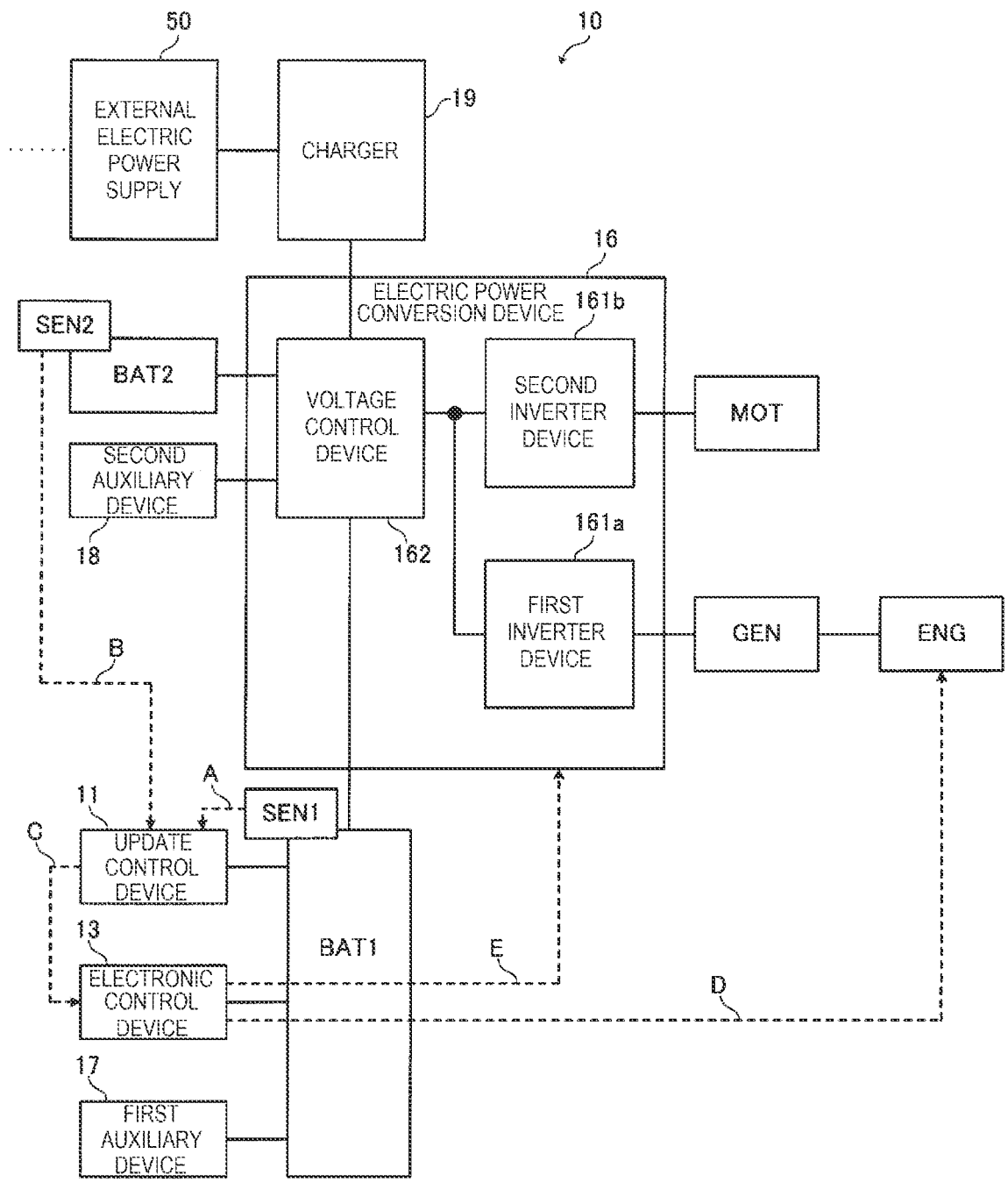
FIG. 10 illustrates an example of an electrical configuration of a vehicle according to a second embodiment.

First, an electrical configuration of the vehicle 10 according to the second embodiment will be described with reference to FIG. 10. As described above, the vehicle 10 according to the second embodiment is a so-called plug-in hybrid electric vehicle, and further includes a charger 19 as illustrated in FIG. 10.

The charger 19 is electrically connectable to an external electric power supply 50 by a connector (not illustrated) or the like. The external electric power supply 50 is, for example, a commercial electric power supply configured to supply an alternating current at a predetermined voltage (for example, 100 [V] to 200 [V]) and a predetermined frequency (for example, 50 [Hz]) to 60 [Hz]). When connected to the external electric power supply 50, the charger 19 converts the alternating current from the external electric power supply 50 into a direct current and outputs the direct current to the electric power conversion device 16 (the voltage control device 162). The charger 19 includes, for example, a power factor correction (PFC) circuit configured to convert an input alternating current into a direct current.

In the second embodiment, the electric power conversion device 16 can output electric power corresponding to the electric power received from the charger 19 to the first battery BAT 1 and the second battery BAT 2. For example, under control of the electronic control device 12 configured to control the electric power conversion device 16, the electric power conversion device 16 outputs the electric power corresponding to the electric power received from the charger 19 to the first battery BAT 1 and the second battery BAT 2. Accordingly, the first battery BAT 1 and the second battery BAT 2 can be charged by the electric power supplied from the external electric power supply 50 to the vehicle 10.

[Processing Executed by Update Control Device According to Second Embodiment]

Figure 11:
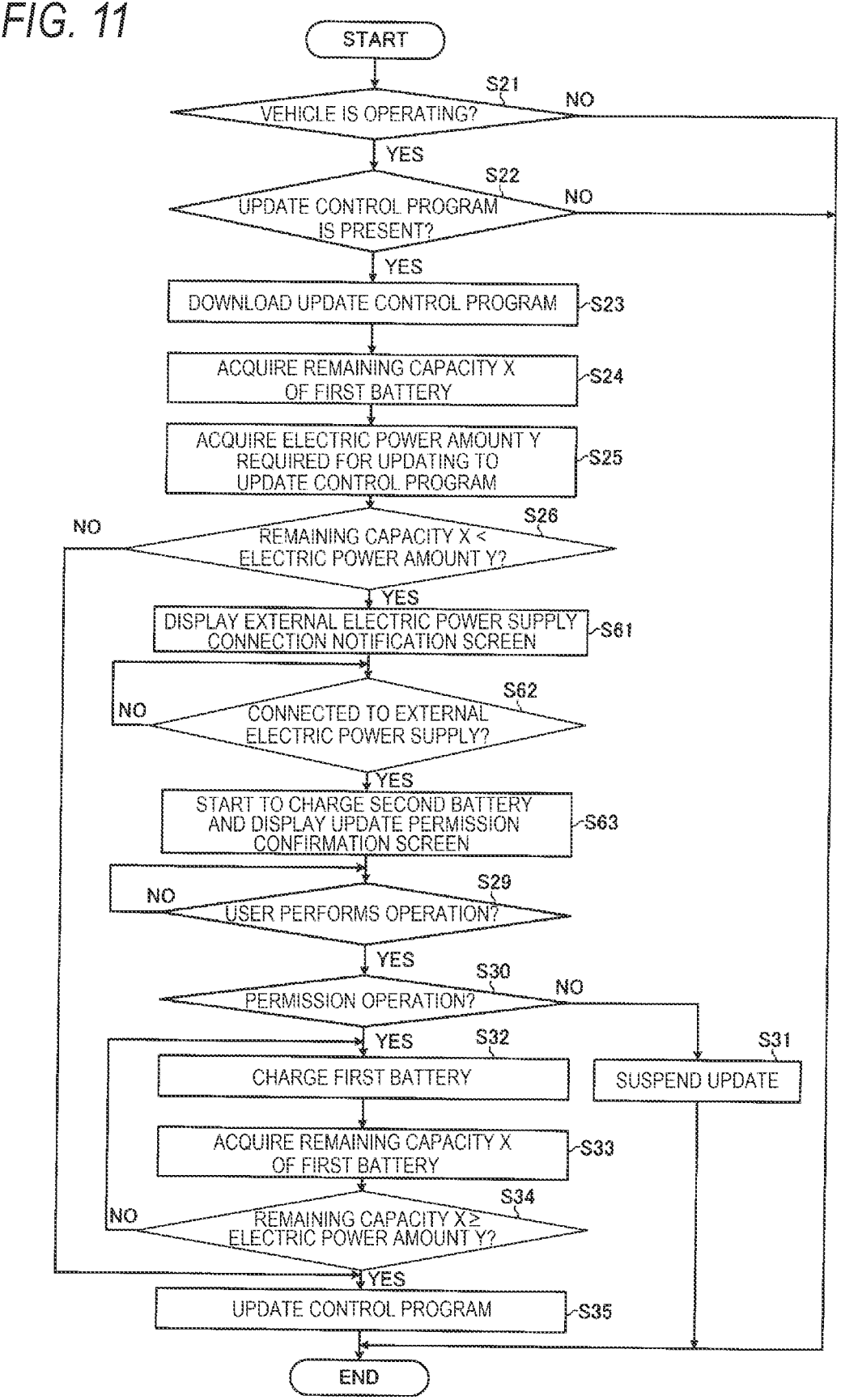
FIG. 11 is a flowchart illustrating an example of processing executed by an update control device according to the second embodiment.

Next, an example of specific processing executed by the update control device 11 according to the second embodiment will be described with reference to FIG. 11. As illustrated in FIG. 11, the update control device 11 according to the second embodiment executes the processing up to step S26 described in the first embodiment to determine whether the remaining capacity X is smaller than the electric power amount Y. If the remaining capacity X is smaller than the electric power amount Y (YES in step S26), the update control device 11 displays, on the navigation device 15, an external electric power supply connection notification screen that gives a notification to connect the charger 19 and the external electric power supply 50 (step S61). An example of the external electric power supply connection notification screen will be described later with reference to FIG. 12.

Then, the update control device 11 is on standby until the charger 19 and the external electric power supply 50 are connected (NO in step S62). When the charger 19 and the external electric power supply 50 are connected (YES in step S62), the update control device 11 starts to charge the second battery BAT 2 with the electric power supplied from the external electric power supply 50, and displays the update permission confirmation screen on the navigation device 15 (step S63). Thereafter, the update control device 11 executes the processing from step S29 described in the first embodiment.

In the second embodiment, in the processing in step S32, the first battery BAT 1 is charged with the electric power supplied from the external electric power supply 50. Accordingly, the electric power required for updating the control program can be stably charged to the first battery BAT 1 without requiring the electric power of the second battery BAT 2 or the electric power generation by the generator GEN.

In the second embodiment, the charging of the second battery BAT 2 started by the processing in step S63 and the charging of the first battery BAT 1 performed by the processing in step S32 may be performed at the same time. At this time, for example, the update control device 11 reduces the electric power supplied to the second battery BAT 2 from the electric power supplied from the external electric power supply 50 as compared with that before the processing in step S32, and supplies the corresponding electric power to the first battery BAT 1. Accordingly, it is possible to increase the electric power supplied to the first battery BAT 1 and to quickly charge the electric power required for updating the control program to the first battery BAT 1 without increasing a maximum output that can be output from the external electric power supply 50 or the charger 19.

[External Electric Power Supply Connection Notification Screen and Update Permission Confirmation Screen According to Second Embodiment]

Figure 12:
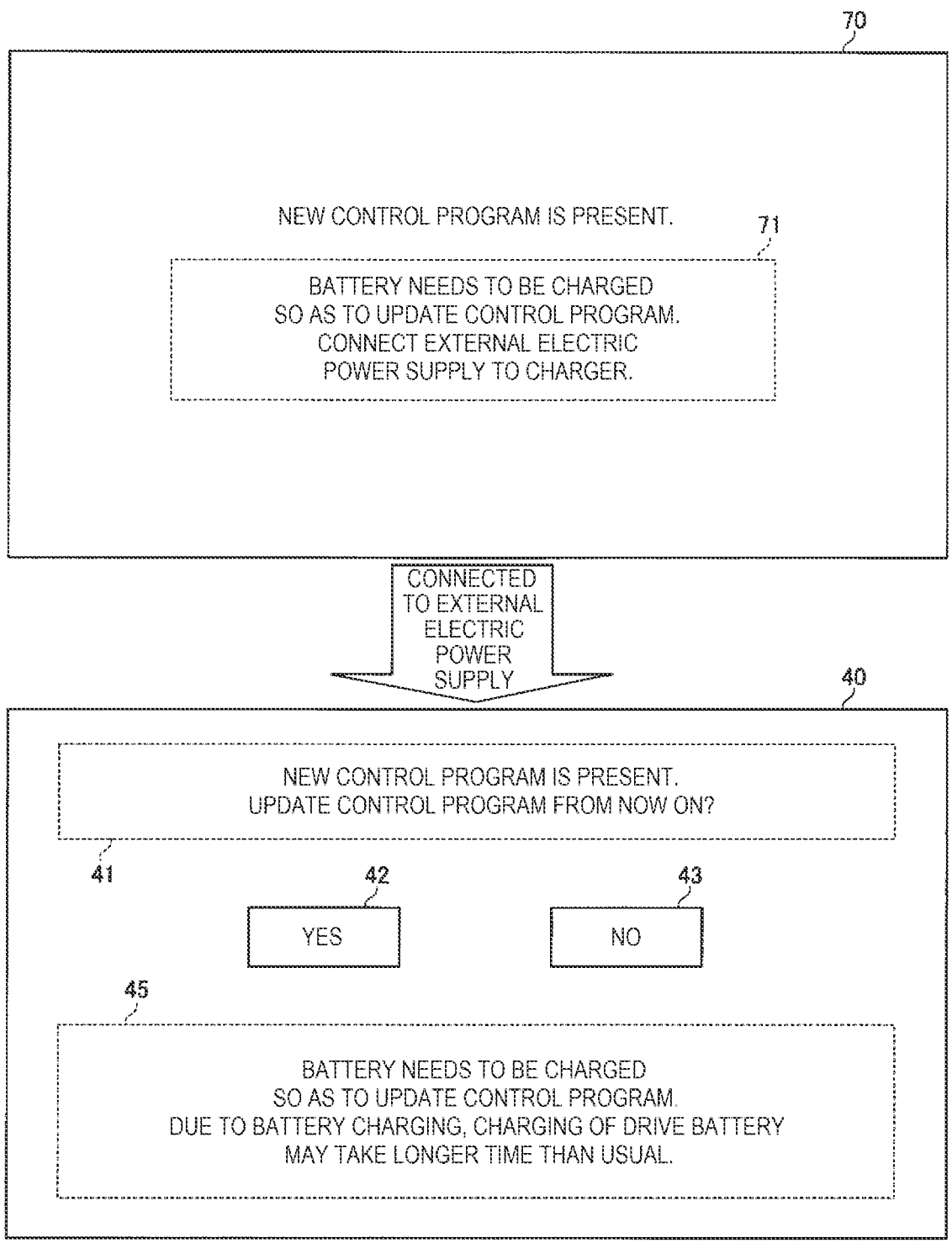
FIG. 12 illustrates an example of an external electric power supply connection notification screen and an update permission confirmation screen according to the second embodiment.

Next, examples of the external electric power supply connection notification screen and the update permission confirmation screen according to the second embodiment will be described with reference to FIG. 12. As illustrated in FIG. 12, the external electric power supply connection notification screen 70 displays a message 71 that gives a notification to connect the charger 19 and the external electric power supply 50. Accordingly, it is possible to prompt the user to perform charging by the external electric power supply 50, and to increase a chance of updating the control program.

When the charger 19 and the external electric power supply 50 are connected, the update control device 11 displays the update permission confirmation screen 40. On the update permission confirmation screen 40 according to the second embodiment, for example, instead of the message 44 on the update permission confirmation screen 40 according to the first embodiment, a message 45 that notifies the user that the charge time of the second battery BAT 2 may be long is displayed. Accordingly, the user can perform the permission operation or the non-permission operation in consideration of a possibility that the charging time of the second battery BAT 2 is long.

Here, the permission operation button 42 and the non-permission operation button 43 are displayed on the update permission confirmation screen 40. However, the present disclosure is not limited thereto. For example, a display content of the update permission confirmation screen 40 and a display content of the external electric power supply connection notification screen 70 may be displayed on one display screen. That is, the notification of performing charging by the external electric power supply 50 and the reception of the operation as to whether to permit the charging of the first battery BAT 1 by the external electric power supply 50 may be performed at the same time.

As described above, when the update control program is present, the update control device 11 according to the second embodiment charges the first battery BAT 1 with the electric power from the external electric power supply 50 until the remaining capacity X of the first battery BAT 1 becomes the electric power amount Y or larger if the remaining capacity X is smaller than the electric power amount Y. Then, the update control device 11 can cause the electronic control device 12 to update the control program based on the update control program when the remaining capacity X becomes the electric power amount Y or larger. Accordingly, the update control device 11 according to the second embodiment can also early update the control program of the electronic control device 12 while preventing an update failure of the control program due to insufficient electric power of the first battery BAT 1.

The present disclosure is not limited to the embodiments described above, and modifications, improvements, or the like can be made as appropriate.

For example, in the above-described embodiments, the update control device 11 updates the control program of the electronic control device 12. However, the present disclosure is not limited thereto. The update control program of the update control device 11 may be registered in the server device 20. In this case, the update control device 11 may acquire the electric power amount Y required for the update control device 11 to update the control program in the processing in step S25, and may update the control program of the update control device 11 based on the update control program in the processing in step S35.

For example, in the embodiments described above, an example has been described in which the vehicle 10 is a hybrid electric vehicle. However, the present disclosure is not limited thereto. The vehicle 10 may be, for example, an electric vehicle or a fuel vehicle that include only the motor MOT as a power source.

The present specification describes at least the following matters. Components corresponding to those according to the embodiments described above are illustrated in parentheses. However, the present disclosure is not limited thereto.

(1) A program update method for updating a control program of a control device (the electronic control device 12) configured to control an in-vehicle device (the in-vehicle device 13) mounted on a vehicle (the vehicle 10), the program update method including:

a first step (step S24) of acquiring a remaining capacity of electric power stored in an electric power storage device (the first battery BAT 1), the electric power storage device being configured to supply electric power to the control device updating the control program;

a second step (step S25) of acquiring an electric power amount required for the control device to update the control program;

a third step (step S26) of determining whether the remaining capacity acquired in the first step is smaller than the electric power amount acquired in the second step;

a fourth step (steps S31 to S33) of charging the electric power storage device such that the remaining capacity becomes the electric power amount or larger wien it is determined that the remaining capacity is smaller than the electric power amount in the third step; and a fifth step (step S34) of causing the control device to update the control program when the remaining capacity becomes the electric power amount or larger in the fourth step, in which the first to fifth steps are performed when the vehicle is operating.

According to (1), when the remaining capacity of the electric power storage device is smaller than the electric power amount required for updating the control program, the electric power storage device is charged such that the remaining capacity becomes the electric power amount required for updating the control program or larger, and the control program is updated. Therefore, it is possible to early update the control program while preventing an update of the control program from failing due to insufficient electric power of the electric power storage device.

(2) The program update method according to (1),
in which the vehicle further includes:
another electric power storage device (the second battery BAT 2) configured to output a voltage higher than that of the electric power storage device; and
an electric motor (the motor MOT) configured to output power for driving the vehicle by being supplied with electric power from the other electric power storage device,
in which the electric power storage device is configured to be charged by the electric power from the other electric power storage device, and
in which, in the fourth step, the electric power storage device is charged with electric power from the other electric power storage device.

According to (2), since the electric power storage device can be charged by the electric power from the other power storage device configured to supply electric power to the electric motor, the electric power storage device can be charged without requiring an external electric power supply or the like.

(3) The program update method according to (2),
in which, when the electric power storage device is charged with electric power from the other electric power storage device, electric power of the other electric power storage device to be supplied to the electric motor is reduced as compared with that when the electric power storage device is not charged with electric power from the other electric power storage device.

According to (3), when the electric power storage device is charged with electric power from the other electric power storage device, electric power of the other electric power storage device to be supplied to the electric motor is reduced as compared with that when the electric power storage device is not charged with electric power from the other electric power storage device. Therefore, it is possible to increase electric power of the other electric power storage device that can be supplied to the electric power storage device without increasing a maximum output of the other electric power storage device.

(4) The program update method according to (2) or (3),
in which the vehicle further includes an auxiliary device (the second auxiliary device 18) configured to perform predetermined operation by being supplied with electric power from the other electric power storage device, and in which, when the electric power storage device is charged with electric power from the other electric power storage device, electric power of the other electric power storage device to be supplied to the auxiliary device is reduced as compared with that when the electric power storage device is not charged with electric power from the other electric power storage device.

According to (4) when the electric power storage device is charged with electric power from the other electric power storage device, electric power of the other electric power storage device to be supplied to the auxiliary device is reduced as compared with that when the electric power storage device is not charged with electric power from the other electric power storage device. Therefore, it is possible to increase electric power of the other electric power storage device that can be supplied to the electric power storage device without increasing the maximum output of the other electric power storage device.

(5) The program update method according to (1),
in which the vehicle further includes:
an internal combustion engine (the engine ENG); and
a generator (the generator GEN) configured to generate electric power by power of the internal combustion engine,
in which the electric power storage device is configured to be charged with electric power generated by the generator, and
in which, in the fourth step, the electric power storage device is charged with electric power generated by the generator, and when the electric power storage device is charged, an electric power generation amount of the generator is increased by increasing a rotation speed of the internal combustion engine as compared with that when the electric power storage device is not charged.

According to (5), the electric power storage device is charged with electric power generated by the generator configured to generate electric power by power of the internal combustion engine, and when the electric power storage device is charged, the electric power generation amount of the generator is increased by increasing the rotation speed of the internal combustion engine as compared with that when the electric power storage device is not charged. Therefore, it is possible to quickly charge the electric power storage device.

(6) The program update method according to any one of (1) to (5), further including:
a sixth step (steps S29 and S30) for receiving operation as to whether to permit charging of the electric power storage device when it is determined that the remaining capacity is smaller than the electric power amount in the third step,
in which the fourth step is performed when operation to permit charging of the electric power storage device is received in the sixth step.

According to (6), since the fourth step is performed when the operation to permit charging of the electric power storage device is received, it is possible to prevent the electric power storage device from being charged for updating the control program against a will of the user.

(7) The program update method according to (6),
in which the sixth step is performed when the vehicle approaches a predetermined parking point.

According to (7), since the sixth step is performed when the vehicle approaches the parking point, it is possible to make a charge request for the electric power storage device by which the permission of the user is likely to be obtained.

(8) The program update method according to (2), in which the electric power storage device and the other electric power storage device are configured to be charged with electric power supplied from an external electric power supply (the external electric power supply 50), and in which, in the fourth step, the electric power storage device is charged with electric power from the external electric power supply when the other electric power storage device is charged with electric power supplied from the external electric power supply.

According to (8), the electric power storage device is charged with electric power from the external electric power supply when the other electric power storage device is charged with electric power supplied from the external electric power supply. Therefore, it is possible to charge electric power for updating the control program to the electric power storage device together with the charging of the other electric power storage device.

(9) The program update method according to (8), further including:

a seventh step (step S61) of giving a notification to perform charging by the external electric power supply when it is determined that the remaining capacity is smaller than the electric power amount in the third step.

According to (9), when the remaining capacity of the electric power storage device is smaller than the electric power amount required for updating the control program, the notification to perform charging by the external electric power supply is given. Therefore, it is possible to prompt the user to perform the charging, and to increase a chance of updating the control program.

(10) The program update method according to (9), further including:

an eighth step (steps S29 and S30) of receiving operation as to whether to permit charging of the electric power storage device by the external electric power supply, the eighth step being performed simultaneously with or after the seventh step, in which the fourth step is performed when operation to permit charging of the electric power storage device is received in the eighth step.

According to (10), since the fourth step is performed when the operation to permit charging of the electric power storage device by the external electric power supply is received, it is possible to prevent the electric power storage device from being charged for updating the control program against the will of the user.

(11) The program update method according to any one of (1) to (10), in which the electric power amount vanes according to a data amount of the control program to be updated.

According to (11), since the electric power amount required for updating the control program varies according to the data amount of the control program, it is possible to obtain the electric power amount according to the data amount of the update control program.

What is claimed is:

1. A program update method for updating a control program of a control device configured to control an in-vehicle device mounted on a vehicle, the program update method comprising:

a first step of acquiring a remaining capacity of electric power stored in an electric power storage device, the electric power storage device being configured to supply electric power to the control device updating the control program;

a second step of acquiring an electric power amount required for the control device to update the control program;

a third step of determining whether the remaining capacity acquired in the first step is smaller than the electric power amount acquired in the second step;

a fourth step of charging the electric power storage device such that the remaining capacity becomes the electric power amount or larger when it is determined that the remaining capacity is smaller than the electric power amount in the third step;

a fifth step of causing the control device to update the control program when the remaining capacity becomes the electric power amount or larger in the fourth step; and a sixth step for receiving operation from a user as to whether to permit charging of the electric power storage device while notifying the user that a fuel consumption and a driving performance of the vehicle may be temporarily deteriorated as the electric power storage device is charged when it is determined that the remaining capacity is smaller than the electric power amount in the third step, wherein the first to sixth steps are performed when the vehicle is operating, and wherein the fourth step is performed when operation to permit charging of the electric power storage device is received in the sixth step.

2. The program update method according to claim 1, wherein the vehicle further includes:

another electric power storage device configured to output a voltage higher than that of the electric power storage device; and an electric motor configured to output power for driving the vehicle by being supplied with electric power from the other electric power storage device, wherein the electric power storage device is configured to be charged by the electric power from the other electric power storage device, and wherein, in the fourth step, the electric power storage device is charged with electric power from the other electric power storage device.

3. The program update method according to claim 2, wherein, when the electric power storage device is charged with electric power from the other electric power storage device, electric power of the other electric power storage device to be supplied to the electric motor is reduced as compared with that when the electric power storage device is not charged with electric power from the other electric power storage device.

4. The program update method according to claim 2, wherein the vehicle further includes an auxiliary device configured to perform predetermined operation by being supplied with electric power from the other electric power storage device, and wherein, when the electric power storage device is charged with electric power from the other electric power storage device, electric power of the other electric power storage device to be supplied to the auxiliary device is reduced as compared with that when the electric power storage device is not charged with electric power from the other electric power storage device.

5. The program update method according to claim 1, wherein the vehicle further includes:

an internal combustion engine; and a generator configured to generate electric power by power of the internal combustion engine, wherein the electric power storage device is configured to be charged with electric power generated by the generator, and wherein, in the fourth step, the electric power storage device is charged with electric power generated by the generator, and when the electric power storage device is charged, an electric power generation amount of the generator is increased by increasing a rotation speed of the internal combustion engine as compared with that when the electric power storage device is not charged.

6. The program update method according to claim 1, wherein the sixth step is performed when the vehicle approaches a predetermined parking point.

7. A program update method for updating a control program of a control device configured to control an in-vehicle device mounted on a vehicle, the program update method comprising:
- a first step of acquiring a remaining capacity of electric power stored in an electric power storage device, the electric power storage device being configured to supply electric power to the control device updating the control program;
- a second step of acquiring an electric power amount required for the control device to update the control program;
- a third step of determining whether the remaining capacity acquired in the first step is smaller than the electric power amount acquired in the second step;
- a fourth step of charging the electric power storage device such that the remaining capacity becomes the electric power amount or larger when it is determined that the remaining capacity is smaller than the electric power amount in the third step; and
- a fifth step of causing the control device to update the control program when the remaining capacity becomes the electric power amount or larger in the fourth step, wherein the first to sixth steps are performed when the vehicle is operating, wherein the vehicle further includes:
- another electric power storage device configured to output a voltage higher than that of the electric power storage device; and
- an electric motor configured to output power for driving the vehicle by being supplied with electric power from the other electric power storage device, wherein the electric power storage device and the other electric power storage device are configured to be charged with electric power supplied from an external electric power supply, and wherein, in the fourth step, the electric power storage device is charged with electric power from the external electric power supply when the other electric power storage device is charged with electric power supplied from the external electric power supply, wherein the program update method further comprises:
- a seventh step of notifying a user of the vehicle to perform charging by the external electric power supply when it is determined that the remaining capacity is smaller than the electric power amount in the third step; and
- an eighth step of receiving operation from the user as to whether to permit charging of the electric power storage device by the external electric power supply while notifying the user that the charge time of the other electric power storage device may be long, the eighth step being performed simultaneously with or after the seventh step, and wherein the fourth step is performed when operation to permit charging of the electric power storage device is received in the eighth step.

8. The program update method according to claim 1, wherein the electric power amount varies according to a data amount of the control program to be updated.

* * * * *